UNITED STATES PATENT OFFICE.

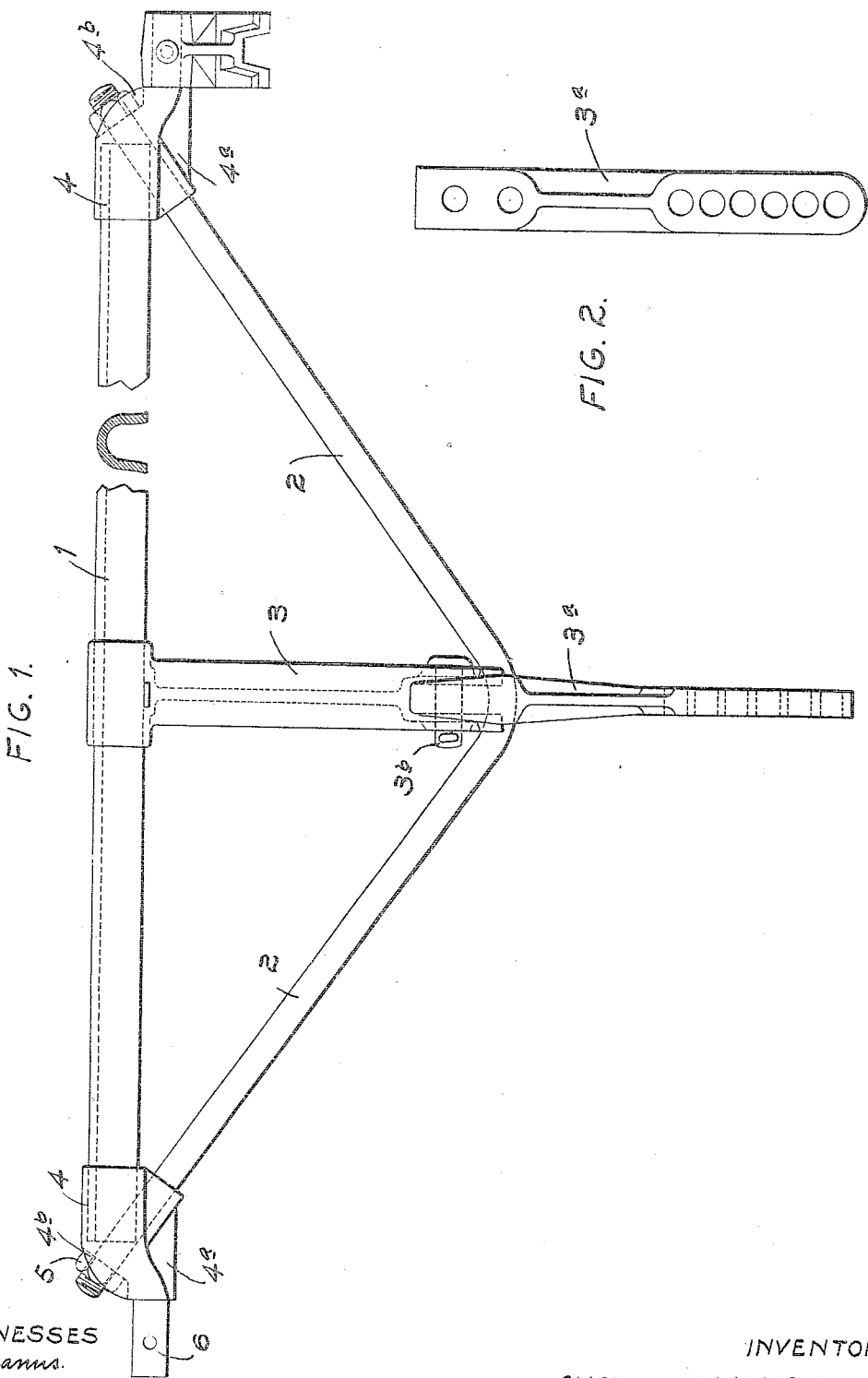

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION.

BRAKE-BEAM.

953,772.  Specification of Letters Patent.  Patented Apr. 5, 1910.

Application filed June 28, 1909. Serial No. 504,824.

*To all whom it may concern:*

Be it known that I, CHARLES H. WILLIAMS, Jr., a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a plan view of my improved brake beam. Fig. 2 is a detail view of the strut extension.

This invention relates to a new and useful improvement in brake beams, and is designed particularly for use as a "high speed" brake beam. These so-called "high speed" brake beams are largely used on passenger coaches, sleeping and dining cars.

The object of my present invention is to materially increase the sizes of the compress and tension members without increasing the size of the sleeve, whereby the brake heads now in use can be employed on my improved beam. In this manner I am enabled to get a very strong brake beam, that is, one which will show a minimum deflection under a maximum load.

Heretofore, where the size of the so-called sleeve or thrust block is limited to accommodate brake heads of standard size, such as prescribed by the Master Car Builders, the limit of sizes of compression members and tension members, of various forms, where they pass through the thrust block or sleeve, has been reached. Hence it has been impossible in existing constructions to get heavier forms of compression and tension members through the restricted space allowed, and consequently it has been impossible to supply the demand for stronger or more rigid brake beams where the limitation of size concerning the brake head and sleeve remains the same.

My improved construction, while apparently simple, is most important, as it meets recent requirements for increased efficiency in brake beam construction. It is possible according to my invention to increase the size of the short tension rod, without interfering with other dimensions, which enables me to get a brake beam of any required capacity.

According to the requirements of the new Westinghouse brake, the brake beam must stand a load of 42,000 pounds, with one-sixteenth of an inch (1/16") deflection. This has been thought impossible of attainment on account of the limitations of the fixed dimensions. In my construction I can use a tension rod 1–7/8 inches in diameter and increase the size of the compression member, as desired.

According to my present invention, I construct a sleeve or thrust block in such manner as to receive the tension and compression members, regardless of the sizes of these members, and then, beyond point of connection of these parts, provide a seat for the sleeve. Preferably, this sleeve or thrust block is in the form of a casting suitably reinforced by strengthening ribs. Or, to briefly describe my invention in another way, I extend the sleeve or thrust block inwardly beyond the brake head, where it is enlarged to receive the compression and tension members, the said tension member being thus made "shorter" than the length of the beam, that is, the nuts on the threads on the ends thereof are located within instead of outside the brake heads.

In the drawings, 1 indicates the compression member, which may be of any desired form, but I have shown such compression member as being in the form of an inverted U. 2 is the tension member, which likewise may be of any form, but I have shown it as a solid round rod, threaded on its ends.

3 is the strut, which may be of any desired character, but which in the particular type of "high speed" brake beam shown is constructed of two parts, one of which constitutes the strut proper, having a seat for the compression member and also a seat for the tension member, while the other of said parts 3ᵃ is provided with a seat for the tension member and an inward extension which is secured to the strut portion by means of a pin 3ᵇ.

4 is the thrust block or sleeve provided with an opening to receive the end of the compression member and to take up the end thrust thereof. Said block is also provided with an opening for the passage of the tension rod, the outer face of said block constituting a seat for the nut 5, by which camber may be placed in the compression member. This casting may be reinforced by strengthening ribs 4ª and 4ᵇ as shown.

6 is the mount for the brake head, which extends in the form of a trunnion from the thrust block 4. This trunnion or brake head mount may be shaped to receive various makes and designs or brake heads, such for instance, as the adjustable head, etc., if it is desired to provide the brake beam with such heads.

I claim:

1. In a brake beam, the combination of a compression member, a tension member arranged in the plane of the compression member, and extending beyond the end thereof, and a thrust block through which said tension member passes, means for placing tension in said tension member, said thrust block having a mount for the brake head beyond the end of said compression member.

2. In a brake beam, the combination of a compression member, a tension member arranged in the plane of the compression member, and extending beyond the end thereof, and a thrust block through which said tension member passes, means for placing tension in said tension member, said thrust block having a mount for the brake head beyond the end of said tension member.

3. In a brake beam, the combination of a compression member, a tension member arranged in the plane of the compression member, and extending beyond the end thereof, and a thrust block through which said tension member passes, means for placing tension in said tension member, said thrust block having a brake head arranged thereon beyond the end of the compression member.

4. In a brake beam, the combination of a compression member, a tension member arranged in the plane of the compression member, and extending beyond the end thereof, and a thrust block through which said tension member passes, means for placing tension in said tension member, said thrust block having a brake head arranged thereon beyond the end of the tension member.

5. A trussed brake beam, comprising a compression member, a tension member arranged in the plane of the compression member and extending beyond the end thereof, and a strut, said tension member having its ends terminating within the line of the brake heads.

6. In a brake beam, the combination of a commercially rolled compression member, a tension member arranged in the plane of the compression member, and extending beyond the end thereof, a strut, and a thrust block in which said compression member is seated and through which said tension member passes, said thrust block being provided with an outward extension or mount on which the brake head is arranged.

7. A thrust block for brake beams provided with a seat for the compression member, an obliquely disposed opening for the tension member in the plane of the seat for the compression member and whose axial line intersects the axial line of said seat, and an outwardly projecting part for the reception of the brake head.

8. A thrust block for brake beams having a seat for the compression member, an opening for the tension member, an inclined face constituting a seat for the end of the tension member, and an outwardly projecting part for receiving the brake head and reinforcing webs or ribs.

9. A brake beam comprising a compression member, a tension member, thrust blocks, and a strut, said thrust blocks being provided with eccentrically positioned mounts to receive the brake heads.

In testimony whereof I hereunto affix my signature in the presence of two witnesses, this 19th day of June, 1909.

CHARLES H. WILLIAMS, Jr.

Witnesses:
E. B. LEIGH,
CHAS. KURTZ.